United States Patent
Barrick et al.

(10) Patent No.: US 8,683,180 B2
(45) Date of Patent: Mar. 25, 2014

(54) INTERMEDIATE REGISTER MAPPER

(75) Inventors: Brian D. Barrick, Pflugerville, TX (US); Michael Billeci, Poughkeepsie, TX (US); Lee E. Eisen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 12/578,272

(22) Filed: Oct. 13, 2009

(65) Prior Publication Data

US 2011/0087865 A1     Apr. 14, 2011

(51) Int. Cl.
G06F 15/00     (2006.01)
(52) U.S. Cl.
USPC ........................................... 712/217
(58) Field of Classification Search
None
See application file for complete search history.

(56) References Cited

U.S. PATENT DOCUMENTS

| | | | |
|---|---|---|---|
| 6,240,507 B1 * | 5/2001 | Derrick et al. | 712/217 |
| 6,311,267 B1 * | 10/2001 | Nguyen et al. | 712/217 |
| 6,587,941 B1 | 7/2003 | Flacks et al. | |
| 6,615,340 B1 | 9/2003 | Wilmot, II | |

FOREIGN PATENT DOCUMENTS

WO    2008/022288    2/2008

* cited by examiner

Primary Examiner — Andrew Caldwell
Assistant Examiner — John Lindlof
(74) Attorney, Agent, or Firm — Yudell Isidore Ng Russell PLLC

(57) ABSTRACT

A method, processor, and computer program product employing an intermediate register mapper within a register renaming mechanism. A logical register lookup determines whether a hit to a logical register associated with the dispatched instruction has occurred. In this regard, the logical register lookup searches within at least one register mapper from a group of register mappers, including an architected register mapper, a unified main mapper, and an intermediate register mapper. A single hit to the logical register is selected among the group of register mappers. If an instruction having a mapper entry in the unified main mapper has finished but has not completed, the mapping contents of the register mapper entry in the unified main mapper are moved to the intermediate register mapper, and the unified register mapper entry is released, thus increasing a number of unified main mapper entries available for reuse.

21 Claims, 4 Drawing Sheets

INTERMEDIATE REGISTER MAPPER

BACKGROUND OF THE INVENTION

The present disclosure relates to the field of processors and, more particularly, to mapper-based rename mechanisms in out of order (OoO) processors.

An OoO processor typically contains multiple execution pipelines that may opportunistically execute instructions in a different order than what the program sequence (or "program order") specifies in order to maximize the average instruction per cycle rate by reducing data dependencies and maximizing utilization of the execution pipelines allocated for various instruction types. Results of instruction execution are typically held temporarily in the physical registers of one or more register files of limited depth. An OoO processor typically employs register renaming to avoid unnecessary serialization of instructions due to the reuse of a given architected register by subsequent instructions in the program order.

Under register renaming operations, each architected (i.e., logical) register targeted by an instruction is mapped to a unique physical register in a register file. In current high-performance OoO processors, a unified main mapper is utilized to manage the physical registers within multiple register files. In addition to storing the logical-to-physical register translation (i.e., in mapper entries), the unified main mapper is also responsible for storing dependency data (i.e., queue position data), which is important for instruction ordering upon completion.

In a unified main mapper-based renaming scheme, it is desirable to free mapper entries as soon as possible for reuse by the OoO processor. However, in the prior art, a unified main mapper entry cannot be freed until the instruction that writes to a register mapped by the mapper entry is completed. This constraint is enforced because, until completion, there is a possibility that an instruction that has "finished" (i.e., the particular execution unit (EU) has successfully executed the instruction) will still be flushed before the instruction can "complete" and before the architected, coherent state of the registers is updated.

In current implementations, resource constraints at the unified main mapper have generally been addressed by increasing the number of unified main mapper entries. However, increasing the size of the unified main mapper has a concomitant penalty in terms of die area, complexity, power consumption, and access time.

SUMMARY OF THE ILLUSTRATIVE EMBODIMENTS

There is provided, in a first form, a method for administering a set of one or more physical registers in a data processing system. The data processing system has a processor that processes instructions out-of-order, wherein the instructions reference logical registers and wherein each of the logical registers is mapped to the set of one or more physical registers. In response to dispatch of one or more of the instructions, a register management unit performs a logical register lookup, which determines whether a hit to a logical register associated with the dispatched instruction has occurred within one or more register mappers. In this regard, the logical register lookup searches within at least one register mapper from a group of register mappers, including an architected register mapper, a unified main mapper, and an intermediate register mapper. The register management unit selects a single hit to the logical register among the group of register mappers. If an instruction having a mapper entry in the unified main mapper has finished but has not completed, the register management unit moves logical-to-physical register renaming data of the unified main mapping entry in the unified main mapper to the intermediate register mapper, and the unified main mapper releases the unified main mapping entry prior to completion of the instruction. The release of the unified main mapping entry increases a number of unified main mapping entries available for reuse.

There is also provided, in a second form, a processor. The processor includes instruction processing circuitry, a plurality of physical register files, and a register management unit coupled to the instruction processing circuitry and the plurality of physical register files. The register management unit includes: an architected register mapper, a unified main mapper coupled to the architected register mapper, and an intermediate register mapper coupled to the architected register mapper and the unified main mapper. The unified main mapper maintains logical-to-physical register renaming data and instruction queue position data of instructions enqueued in an issue queue. The intermediate register mapper stores the logical-to-physical register renaming data. Moreover, the intermediate register mapper does not store dependency data, such as queue position data. If an instruction having a unified main mapping entry in the unified main mapper has finished but has not completed, the register management unit moves logical-to-physical register renaming data from the unified main mapper in response to an instruction having a register mapper entry in the unified main mapper that has finished but has not been completed prior to completion of the instruction.

There is also provided, in a third form, a computer program product. The computer program product includes: a computer readable storage medium and program code stored within the computer readable storage medium that directly operates off a processor. The program code performs the following mapping steps described below. In response to dispatch of one or more instructions, a logical register lookup determines whether a hit to a logical register associated with the dispatched instruction has occurred within at least one register mapper from a group of register mappers including a unified main mapper and an intermediate register mapper. If an instruction having a unified main mapping entry in said unified main mapper has finished but has not completed, the logical-to-physical register renaming data of the unified main mapping entry in the unified main mapper is moved to the intermediate register mapper. In addition to moving the logical-to-physical register renaming data from the unified main mapper to the intermediate register mapper, the unified main mapper entry is released prior to completion of the instruction. The release of the unified main mapping entry increases a number of unified main mapping entries available for reuse.

The above as well as additional features of the present invention will become apparent in the following detailed written description.

BRIEF DESCRIPTION OF THE SEVERAL VIEWS OF THE DRAWINGS

Aspects of the invention itself will best be understood by reference to the following detailed description of an illustrative embodiment when read in conjunction with the accompanying drawings, where.

DETAILED DESCRIPTION OF THE INVENTION

The various methods discussed herein may be implemented within a high performance out-of-order (OoO) computer system, which may include a workstation, personal computer, notebook computer, or handheld computer, and may also be included within a larger system which may further include a plurality of processors in a multi-bus system in a network of similar or heterogeneous systems. Circuit details beyond those shown are not specified to any greater extent than that considered necessary for the understanding and appreciation of the present invention and in order not to obfuscate or distract from the teachings of the present invention.

Figure 1:
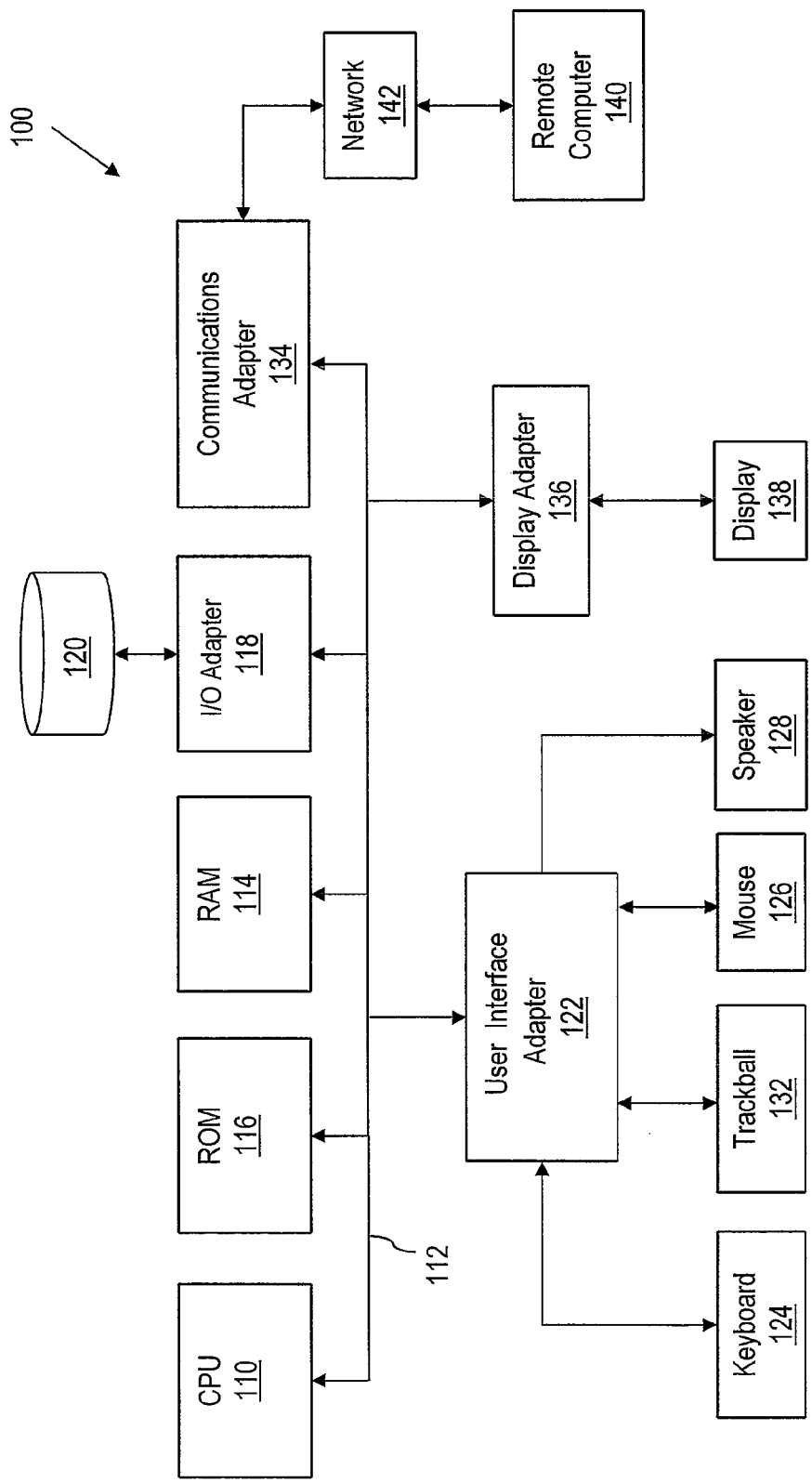
FIG. 1 is a high-level block diagram of an exemplary data processing system in accordance with an embodiment of the present invention.

With reference now to the figures, and in particular to FIG. 1, an example is shown of a data processing system 100 which may include an OoO processor employing an intermediate register mapper as described below with reference to FIG. 2. As shown in FIG. 1, data processing system 100 has a central processing unit (CPU) 110, which may be implemented with processor 200 of FIG. 2. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a storage device 120. Communications adapter 134 interfaces interconnect 112 with network 140, which enables data processing system 100 to communicate with other such systems, such as remote computer 142. Input/Output devices are also connected to interconnect 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, data processing system 100 receives input, for example, throughout keyboard 124, trackball 132, and/or mouse 126 and provides output, for example, via network 142, on storage device 120, speaker 128 and/or display 138. The hardware elements depicted in data processing system 100 are not intended to be exhaustive, but rather represent principal components of a data processing system in one embodiment.

Operation of data processing system 100 can be controlled by program code, such as firmware and/or software, which typically includes, for example, an operating system such as AIX® ("AIX" is a trademark of the IBM Corporation) and one or more application or middleware programs. Such program code comprises instructions discussed below with reference to FIG. 2.

Figure 2:
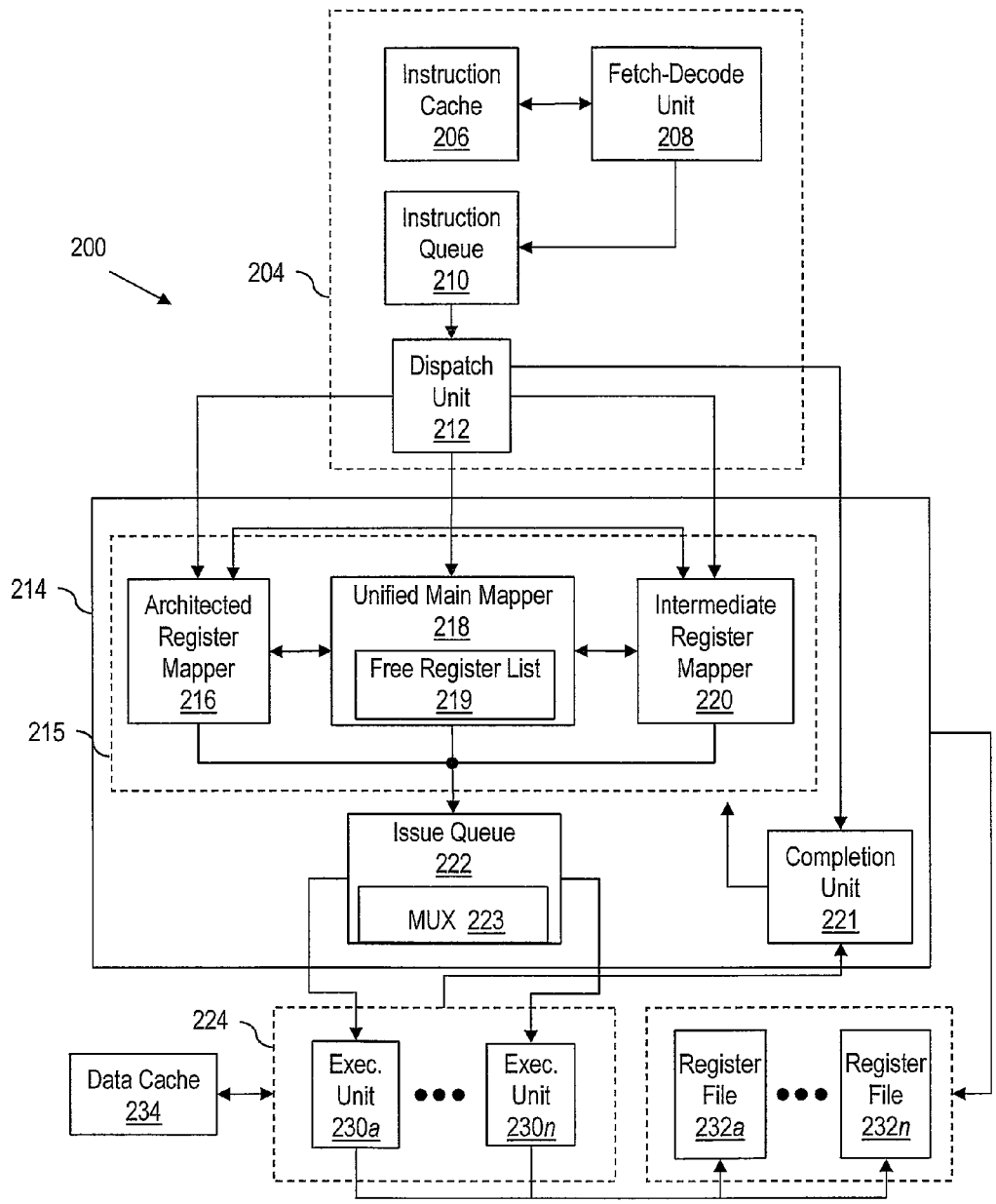
FIG. 2 is a high-level block diagram of an exemplary processor in accordance with an embodiment of the present invention.

Referring now to FIG. 2, there is depicted a superscalar processor 200 according to the principles of the present invention. Instructions are retrieved from memory (e.g., RAM 114 of FIG. 1) and loaded into instruction sequencing logic (ISL) 204, which includes Level 1 Instruction cache (L1 I-cache) 206, fetch-decode unit 208, instruction queue 210 and dispatch unit 212. Specifically, the instructions are loaded in L1 I-cache 206 of ISL 204. The instructions are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 240. Completion unit 240 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, such as floating-point (FP), fixed-point (FX), and load/store (LS). General execution engine 224 exchanges data with data memory (e.g. RAM 114, ROM 116 of FIG. 1) via a data cache 234. Moreover, issue queue 222 may contain instructions of FP type, FX type, and LS instructions. However, it should be appreciated that the invention is not limited in this regard, and any number and types of instructions can be used. During execution, EUs 230a-230n obtain the source operand values from physical locations in register file 232a-232n and store result data, if any, in register files 232a-232n and/or data cache 234.

Still referring to FIG. 2, register management unit 214 includes: (i) mapper cluster 215, which includes architected register mapper 216, unified main mapper 218, intermediate register mapper 220, and (ii) issue queue 222. Mapper cluster 215 tracks the physical registers assigned to the logical registers of various instructions. In an exemplary embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers without limiting the scope of the invention, as described in the exemplary embodiment. Architected register mapper 216 includes a pointer list that identifies a physical register which describes the checkpointed state. Physical register files 232a-232n will typically contain more registers than the number of entries in architected register mapper 216. It should be noted that the particular number of physical and logical registers that are used in a renaming mapping scheme can vary and the invention is not limited in this regard.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order. OoO execution typically occurs when there are older instructions which would take longer (i.e., make use of more clock cycles) to execute than newer instructions in the pipeline. However, should an OoO instruction's executed result require that it be flushed for a particular reason (e.g., a branch misprediction), the processor can revert to the checkpointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an OoO instruction, unified main mapper 218 also keeps track of dependency data (i.e., instructions that are dependent upon the finishing of an older instruction in the pipeline), which is important for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In conventional mapper systems, which lack intermediate register mapper 220, if unified main mapper 218 has a total of 20 mapper entries, there is a maximum of 20 instructions that can be in flight (i.e., not checkpointed) at once. Thus, dispatch unit 212 of a conventional mapper system can conceivably "dispatch" more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

According to one embodiment of the invention, intermediate register mapper 220 serves as a non-timing-critical register for which a "finished", but "incomplete" instruction from unified main mapper 218 could retire to (i.e., removed from unified main mapper 218) in advance of the instruction's eventual completion. Once the instruction "completes", completion unit 240 notifies intermediate register mapper 220 of the completion. The mapper entry in intermediate register mapper 220 can then update the architected coherent state of architected register mapper 216 by replacing the corresponding entry that was presently stored in architected register mapper 216.

When dispatch unit 212 dispatches an instruction, register management unit 214 evaluates the logical register number(s) associated with the instruction against mappings in architected register mapper 216, unified main mapper 218, and intermediate register mapper 220 to determine whether a match (commonly referred to as a "hit") is present in architected register mapper 216, unified main mapper 218, and/or intermediate register mapper 220. This evaluation is referred to as a logical register lookup. When the lookup is performed simultaneously at more than one register mapper (i.e., architected register mapper 216, unified main mapper 218, and/or intermediate register mapper 220), the lookup is referred to as a parallel logical register lookup.

Each instruction that updates the value of a certain target logical register is allocated a new physical register. Whenever this new instance of the logical register is used as a source by any other instruction, the same physical register must be used. As there may exist a multitude of instances of one logical register, there may also exist a multitude of physical registers corresponding to the logical register. Register management unit 214 performs the tasks of (i) analyzing which physical register corresponds to a logical register used by a certain instruction, (ii) replacing the reference to the logical register with a reference to the appropriate physical register (i.e., register renaming), and (iii) allocating a new physical register whenever a new instance of any logical register is created (i.e., physical register allocation).

Initially, before any instructions are dispatched, the unified main mapper 218 will not receive a hit/match since there are no instructions currently in flight. In such an event, unified main mapper 218 creates a mapping entry. As subsequent instructions are dispatched, if a logical register match for the same logical register number is found in both architected register mapper 216 and unified main mapper 218, priority is given to selecting the logical-to-physical register mapping of unified main mapper 218 since the possibility exists that there may be instructions currently executing OoO (i.e., the mapping is in a transient state).

After unified main mapper 218 finds a hit/match within its mapper, the instruction passes to issue queue 222 to await issuance for execution by one of execution units 230. After general execution engine 224 executes and "finishes" the instruction, but before the instruction "completes", register management unit 214 retires the mapping entry presently found in unified main mapper 218 from unified main mapper 218 and moves the mapping entry to intermediate register mapper 220. As a result, a slot in unified main mapper 218 is made available for mapping a subsequently dispatched instruction. Unlike unified main mapper 218, intermediate register mapper 220 does not store dependency data. Thus, the mapping that is transferred to intermediate register mapper 220 does not depend (and does not track) the queue positions of the instructions associated with its source mappings. This is because issue queue 222 retires the "finished, but not completed" instruction is after a successful execution. In contrast, under conventional rename mapping schemes lacking an intermediate register mapper, a unified main mapper continues to store the source rename entry until the instruction completes. Under the present embodiment, intermediate register mapper 220 can be positioned further away from other critical path elements because, unified main mapper 218, its operation is not timing critical.

Once unified main mapper 218 retires a mapping entry from unified main mapper 218 and moves to intermediate register mapper 220, mapper cluster 214 performs a parallel logical register lookup on a subsequently dispatched instruction to determine if the subsequent instruction contains a hit/match in any of architected register mapper 216, unified main mapper 218, and intermediate register mapper 220. If a hit/match to the same destination logical register number is found in at least two of architected register mapper 216, unified main mapper 218, and intermediate register mapper 220, multiplexer 223 in issue queue 222 awards priority by selecting the logical-to-physical register mapping of unified main mapper 218 over that of the intermediate register mapper 220, which in turn, has selection priority over architected register mapper 216. The mechanism by which the selection priority is determined is discussed in conjunction with FIG. 3, described below.

Figure 3:
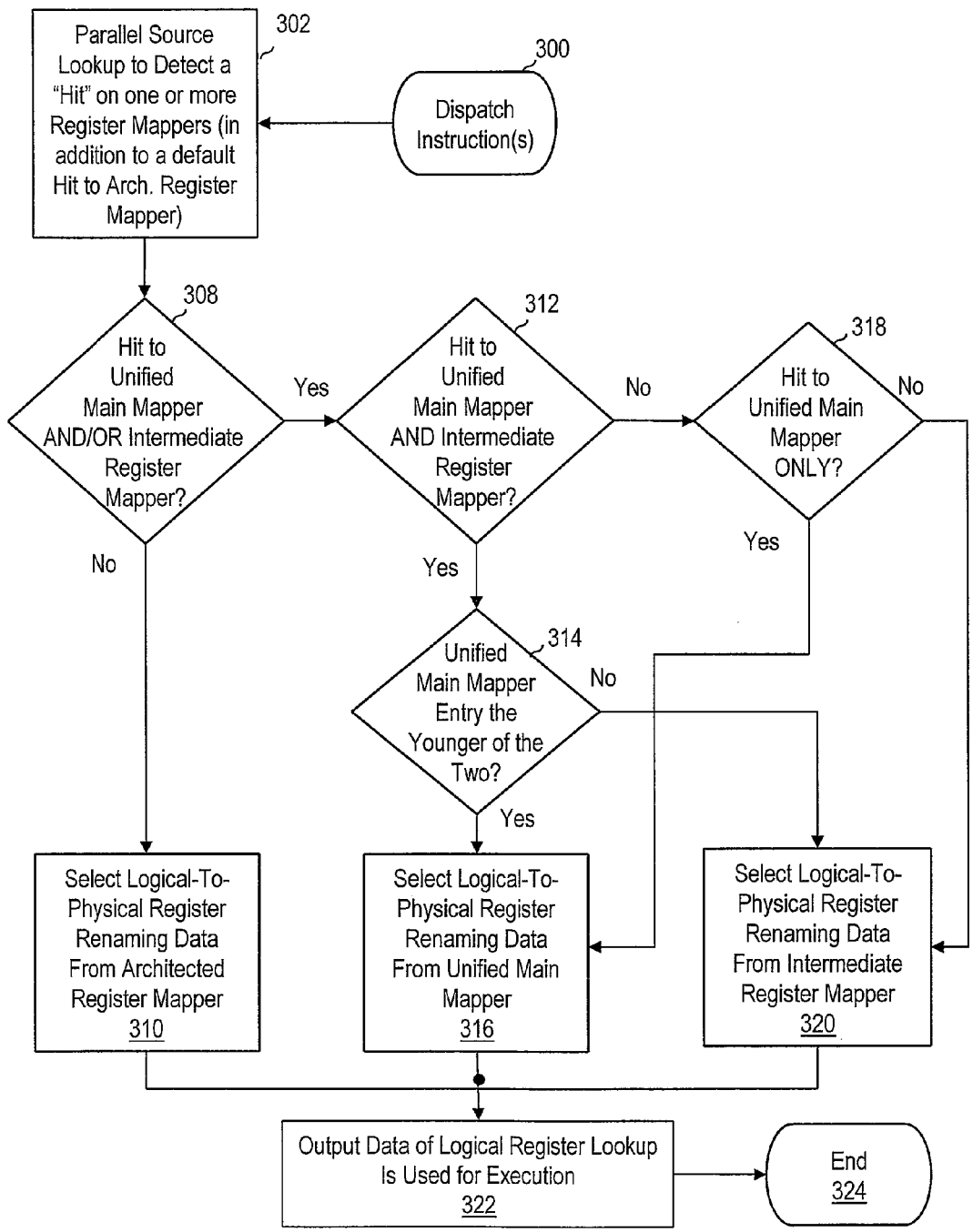
FIG. 3 is a high-level logical flowchart of an exemplary method of determining which mapping data values to use in executing an instruction, in accordance with one embodiment.

Referring now to FIG. 3, there is depicted a high level logical flowchart of an exemplary method of determining which mapping data values to use in executing an instruction, in accordance with one embodiment. References to the elements of FIG. 2, will be made in the context of FIG. 3. The illustrated method begins at block 300 of FIG. 3, which represents dispatch unit 212 dispatching one or more instructions to register management unit 214. In response to the dispatching of the instruction(s), register management unit 214 determines via a parallel logical register lookup whether a "hit" to a logical register (in addition to a "hit" to architected register mapper 216) associated with each dispatched instruction has occurred (block 302). In this regard, it should be understood that architected register mapper 216 is assumed to always have hit/match, since architected register mapper 216 stores the checkpointed state of the logical-to-physical register mapper data. If register management unit 214 does not detect a match/hit in unified main mapper 218 and/or intermediate register mapper 220 (decision block 308), multiplexer 223 selects the logical-to-physical register renaming data from architected register mapper 216 (block 310). If register management unit 214 detects a match/hit in unified main mapper 218 and/or intermediate register mapper 220, register management unit 214 determines in decision block 312 whether a match/hit occurs in both unified main mapper 218 and intermediate register mapper 220. If a hit/match is determined in both mappers 218 and 220, the process continues to decision block 314, which depicts register management unit 214 determining whether the mapping entry in unified main mapper 218 is "younger" (i.e., the creation of the mapping entry is more recent) than the mapping entry in intermediate register mapper 220. If entry in unified main mapper 218 is younger than the entry in intermediate register mapper 220, multiplexer 223 selects the logical-to-physical register renaming data from unified main mapper 218 (block 316). If the entry in unified main mapper 218 is not younger than the entry in intermediate register mapper 220, multiplexer 223 selects the logical-to-physical register renaming data from intermediate register mapper 220 (block 320).

Returning to block 312, if a match/hit does not occur in both unified main mapper 218 and intermediate register mapper 220, the process continues to decision block 318, where it is determined whether an exclusive hit/match to unified main mapper 218 occurs. If an exclusive hit to unified main mapper 218 occurs, multiplexer 223 selects the logical-to-physical register renaming data from unified main mapper 218 (block 316). However, if a hit/match does not occur at unified main mapper 218 (thus, the hit/match exclusively occurs at intermediate register mapper 220), multiplexer 223 selects the logical-to-physical register renaming data from intermediate register mapper 220 (block 320). From blocks 310, 316, and 320, the process continues to block 322, which depicts general execution engine 224 using the output data of the logical register lookup for execution. From block 322, the process ends at termination block 324.

Figure 4:
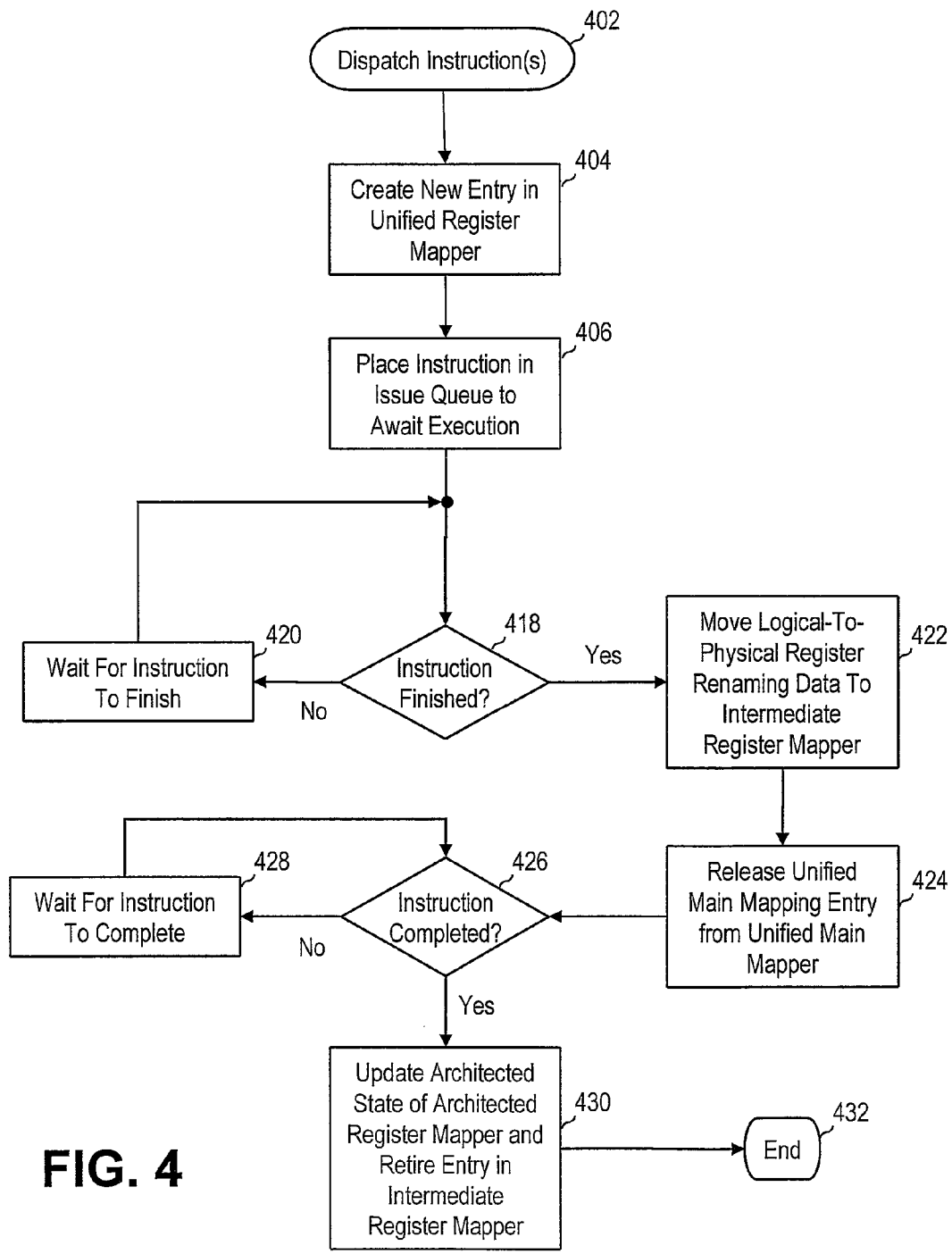
FIG. 4 is a high-level logical flowchart of an exemplary method of managing mapper entries, in accordance with one embodiment.

With reference to FIG. 4, there is depicted a high level logical flowchart of an exemplary method of managing mapper entries, in accordance with one embodiment. The illustrated method begins at block 402, which represents dispatch unit 212 dispatching one or more instructions to register management unit 214. From block 402, the process continues to block 404, which depicts unified main mapper creating a new, logical-to-physical register mapping entry. Issue queue 222 maintains the issue queue position data of the dispatched instruction, which utilizes the mapping entry that is selected via the logical register lookup (described in FIG. 3). General execution engine 224 detects whether any of the instructions under execution has finished (i.e., one of Us 130 has finished execution of an instruction), as depicted in decision block 418. If the issued instruction has not finished, the method waits for an instruction to finish (block 420). In response to general execution engine 224 detecting that an instruction is finished, unified main mapper 218 moves the logical-to-physical register renaming data from unified main mapper 218 to intermediate register mapper 220 (block 422). Unified main mapper 218 retires the unified main mapping entry associated with the finished instruction (block 424). From block 424, the method continues to decision block 426, which depicts completion unit 240 determining whether the finished instruction has completed. If the finished instruction has not completed, completion unit 240 continues to wait until it detects that general execution unit 224 has finished all older instructions (block 428). However, if completion unit 240 detects that the finished instruction has completed, intermediate register mapper 220 updates the architected coherent state of architected register mapper 216 and the intermediate register mapper 220 retires its mapping entry (block 430). From block 430, the method terminates at block 432.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a storage medium storing program code that can be processed by a data processing system.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures). Having thus described the invention of the present application in detail and by reference to preferred embodiments thereof, it will be apparent that modifications and variations are possible without departing from the scope of the invention defined in the appended claims.

What is claimed is:

1. A method for administering physical registers in multiple physical register sets of a processor said method comprising:
 during out-of-order execution by the processor of instructions referencing logical registers:
  recording, in entries of a unified main mapper of the processor, transient mappings between the logical registers referenced by the instructions and physical registers in the multiple physical register sets of the processor;
  recording, in entries of a separate architected register mapper, architected mappings between the logical registers referenced by the instructions and the physical registers of the processor; and
  populating entries of an intermediate register mapper with transient mappings transferred from the unified main mapper; and
 allocating entries in the unified main mapper to instructions following dispatch of the instructions and prior to issue of the instructions to one or more execution units of the processor for execution;
 wherein the populating includes the processor transferring a transient mapping for an instruction that has finished execution but has not been completed by committing its execution results to an architected state of the processor from an entry of the unified main mapper to an entry of the intermediate register mapper and releasing the entry in the unified main mapper prior to completion of the instruction, such that a number of entries in the unified main mapper available for allocation is increased.

2. The method of claim 1, wherein the instruction is a first instruction, the method further comprising:
 in response to dispatch of a second instruction, performing a lookup of a logical register referenced by the second instruction in the unified main mapper, the intermediate mapper and the architected register mapper;
 in response to the lookup resulting in hits in multiple mappers, the processor preferentially selecting a mapping recorded in said unified main mapper over a mapping in said intermediate register mapper, and preferentially selecting a mapping in said intermediate register mapper over a mapping in said architected register mapper; and
 employing the selected mapping in execution of the second instruction.

3. The method of claim 1, further comprising in response to a completion of said instruction, converting the transient mapping for the instruction to an architected mapping by moving the transient mapping from said intermediate register mapper to said architected register mapper.

4. The method of claim 1, wherein said intermediate register mapper is not timing critical.

5. The method of claim 4, wherein said intermediate register mapper does not store issue queue position data.

6. The method of claim 1, and further comprising speculatively executing the instruction.

7. A processor, comprising:
 a dispatch unit from which instructions are dispatched;
 instruction processing circuitry;
 an issue unit that issues dispatched instructions to the instruction processing circuitry for execution;
 a plurality of physical register files;
 a register management unit coupled between the dispatch unit and issue queue, wherein said register management unit includes:
  a unified main mapper including entries containing transient mappings between logical registers referenced by the instructions and physical registers in the plurality of physical register files;
  a separate architected register mapper coupled to the unified main mapper, wherein the architected register mapper includes entries containing architected mappings between the logical registers referenced by the instructions and the physical registers of the processor; and
  a separate intermediate register mapper coupled to said unified main mapper and to the architected register mapper, wherein said intermediate register mapper includes entries containing transient mappings transferred from the unified main mapper;
 wherein the register management unit allocates entries in the unified main mapper to instructions following dispatch of the instructions by the dispatch unit and prior to issue of the instructions to one or more execution units of the processor for execution by the issue unit;
 wherein said register management unit transfers a transient mapping for an instruction that has finished execution but has not been completed by committing its execution results to an architected state of the processor from an entry of the unified main mapper to an entry of the intermediate register mapper and releases the entry in the unified main mapper prior to completion of the instruction, such that a number of entries in the unified main mapper available for allocation is increased.

8. The processor of claim 7, wherein:
 the instruction is a first instruction;
 the register management unit, responsive to dispatch of a second instruction, performs a lookup of a logical register referenced by the second instruction in the unified main mapper, the intermediate mapper and the architected register mapper; and
 said register management unit, responsive to the lookup resulting in hits in multiple mappers, preferentially selects a mapping recorded in the unified main mapper over a mapping in said intermediate register mapper and preferentially selecting a mapping in the intermediate register mapper over a mapping in the architected register mapper, wherein the processor employs the selected mapping in execution of the second instruction.

9. The processor of claim 7, wherein said register management unit, responsive to completion of the instruction, converts the transient mapping for the instruction to an architected mapping by moving the transient mapping from said intermediate register mapper to said architected register mapper.

10. The processor of claim 7, wherein said intermediate register mapper is not timing critical.

11. The processor of claim 10, wherein said intermediate register mapper does not store issue queue position data.

12. The processor of claim 7, wherein said unified main mapper maintains issue queue position data of instructions enqueued in the issue queue.

13. A data processing system comprising the processor in accordance with claim 7 and a data storage unit coupled to said processor via an interconnect bus.

14. A computer program product, comprising: a non-transitory computer-readable storage device; and program code stored within said computer-readable storage device that directly operates off a processor to perform the mapping steps of:

during out-of-order execution by the processor of instructions referencing logical registers:

recording, in entries of a unified main mapper of the processor, transient mappings between the logical registers referenced by the instructions and physical registers in the multiple physical register sets of the processor;

recording, in entries of a separate architected register mapper, architected mappings between the logical registers referenced by the instructions and the physical registers of the processor; and populating entries of an intermediate register mapper with transient mappings transferred from the unified main mapper; and allocating entries in the unified main mapper to instructions following dispatch of the instructions and prior to issue of the instructions to one or more execution units of the processor for execution;

wherein the populating includes the processor transferring a transient mapping for an instruction that has finished execution but has not been completed by committing its execution results to an architected state of the processor from an entry of the unified main mapper to an entry of the intermediate register mapper and releasing the entry in the unified main mapper prior to completion of the instruction, such that a number of entries in the unified main mapper available for allocation is increased.

15. The computer program product of claim 14, wherein:

the instruction is a first instruction;

the program code further causes the processor to perform:

the register management unit, responsive to dispatch of a second instruction, performs a lookup of a logical register referenced by the second instruction in the unified main mapper, the intermediate mapper and the architected register mapper; and said register management unit, responsive to the lookup resulting in hits in multiple mappers, preferentially selects a mapping recorded in the unified main mapper over a mapping in said intermediate register mapper and preferentially selecting a mapping in the intermediate register mapper over a mapping in the architected register mapper, wherein the processor employs the selected mapping in execution of the second instruction.

16. The computer program product of claim 14, wherein the program code further causes the processor to perform:

in response to a completion of said instruction, converting the transient mapping for the instruction to an architected mapping by moving the transient mapping from said intermediate register mapper to said architected register mapper.

17. The computer program product of claim 14, wherein said intermediate register mapper is not timing critical.

18. The computer program product of claim 17, wherein said intermediate register mapper does not store issue queue position data.

19. The method of claim 1, wherein transferring the transient mapping for the instruction to the intermediate mapper comprises transferring the transient mapping for the instruction to the intermediate mapper in response to the instruction finishing execution.

20. The processor of claim 7, wherein the register management unit transfers the transient mapping for the instruction to the intermediate mapper in response to the instruction finishing execution.

21. The computer program product of claim 14, wherein transferring the transient mapping for the instruction to the intermediate mapper comprises transferring the transient mapping for the instruction to the intermediate mapper in response to the instruction finishing execution.

\* \* \* \* \*